United States Patent [19]

Clemons

[11] Patent Number: 4,858,374
[45] Date of Patent: Aug. 22, 1989

[54] BEE TRAP

[76] Inventor: Carl W. Clemons, 4180 Sunset Crt., Ann Arbor, Mich. 48103

[21] Appl. No.: 229,239

[22] Filed: Aug. 8, 1988

[51] Int. Cl.⁴ .............................................. A01M 1/10
[52] U.S. Cl. ..................................................... 43/122
[58] Field of Search ....................... 43/122, 64, 65, 131

[56] References Cited

U.S. PATENT DOCUMENTS

| | | | |
|---|---|---|---|
| 835,264 | 11/1906 | Steinmann | 43/122 |
| 886,218 | 4/1908 | Jolly | 43/131 |
| 970,944 | 9/1910 | Odatey | 43/122 |
| 1,091,550 | 3/1914 | Walters | 43/122 |
| 1,364,949 | 1/1921 | Niewinski | 43/122 |

Primary Examiner—Nicholas P. Godici
Assistant Examiner—William Scott Andes
Attorney, Agent, or Firm—Harness, Dickey & Pierce

[57] ABSTRACT

A bee trap particularly suited for yellow jacket bees having a housing with an enclosed bottom which retains some attractant liquid. A snap fit lid is provided to enclose the upper end of the housing. One or more horizontally extending bee entrance tubes having one end joined to the housing where an aperture is provided for the entrance of bees. The bee entrance tube is of a particular length and configuration and is oriented with respect to the bottom and side surfaces of the housing to present extreme difficulties in enabling a bee to escape the device once inside.

8 Claims, 1 Drawing Sheet

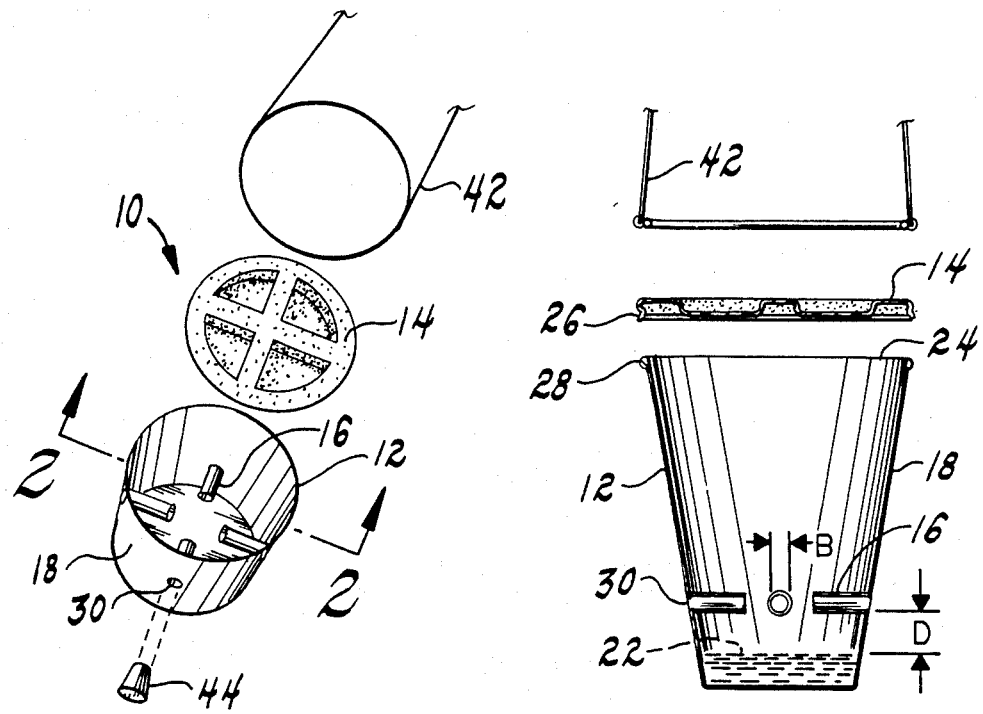
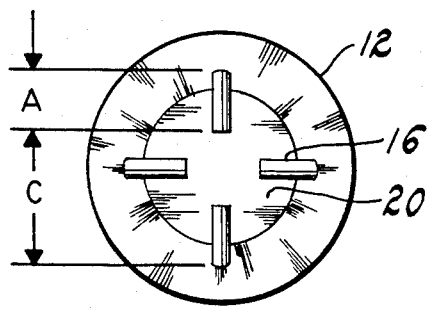
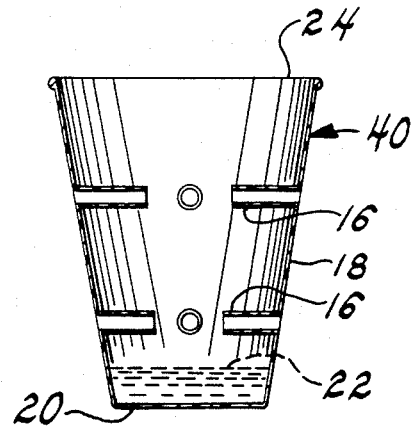

BEE TRAP

BACKGROUND AND SUMMARY OF THE INVENTION

This invention relates to an insect trapping device and particularly to one adapted for outdoor use for capturing bees such as yellow jackets.

During outdoor summertime activities, insect pests can be bothersome. Particularly annoying are bees, such as yellow jackets, which can disturb and sting individuals while participating in barbecues, picnics, outdoor sports, etc. Various approaches toward reducing insect pests are known such as using insect repellent or insect attraction devices which kill or capture the insects. Topically applied insect repellents do not work well when dealing with bees. Various types of bee traps are presently known. Most of these devices require the use of poisons which kill captured insects. The use of insecticides has numerous drawbacks since they are often also toxic to humans. Devices intended to capture and retain bees are typically very complex in their construction and operation, and may not perform the function of capturing and retaining bees effectively.

In view of the foregoing, there is a need to provide an improved bee trap which can be used to attract and capture bees. The trap according to this invention is inexpensive to manufacture and securely imprisons captured bees to prevent their escape.

The bee trap in accordance with this invention includes a housing defining a closed bottom end and an open top. A removable lid is used to enclose the top and one or more bee entrance tubes are provided which extend horizontally into the housing from entrance apertures in the side of the housing. The dimensions of the housing and the bee entrance tubes and their relationships are selected to present significant obstacles to bees attempting to escape the trap once they are inside.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is an exploded pictorial view of a bee trap in accordance with this invention.

FIG. 2 is a cross sectional view of the bee trap shown in FIG. 1, taken along line 2—2.

FIG. 3 is a top view of the housing shown in FIGS. 1 and 2.

FIG. 4 is a side elevational view of a housing in accordance with a second embodiment of this invention.

DETAILED DESCRIPTION OF THE INVENTION

A bee trap in accordance with a first embodiment of the present invention is shown in FIGS. 1 and 2, and is generally designated by reference number 10. Bee trap 10 generally comprises housing 12, lid 14, and one or more bee entrance tubes 16.

Housing 12 defines side surface 18 with an integrally formed bottom 20 and provides a liquid tight reservoir for a quantity of an attractant liquid 22 which can be poured through the opened top 24. As one example of an embodiment of the present invention, housing 12 as shown in the figures has a conical configuration wherein top 24 has a larger diameter than bottom 20. Housing 12 can be made similarly to readily available product forms such as plastic drinking cups which can be purchased inexpensively and disposed of after use. By making housing 12 from a transparent material, the attractant liquid will be visible to bees which is believed to enhance its attracting effect. A transparent housing also enables the user to determine when the trap must be changed or replenished with an attractant.

To prevent the escape of bees once they enter trap 10, it is necessary for lid 14 to be tight fitting onto housing open top 24. In the case shown in the figure, lid 14 defines a seal flange 26 which fits over housing top bead 28 to provide a snap fit connection.

As shown in the figures, bee trap 10 includes a number of horizontally projecting bee entrance tubes 16. The embodiment shown in FIGS. 1, 2 and 3 has a total of four entrance tubes. These tubes have a first end joining housing side surface 18. An aperture 30 is formed on the outside of housing 12 communicating with each of the tubes. In the process of development of this invention, a number of critical parameters were discovered which must be complied with in order to provide maximum assurance that bees which are attracted into the interior of trap 10 cannot thereafter escape. Through careful observation, this inventor has learned that bees cannot readily fly directly into the open inside end of tube 16. Bees require a surface to crawl on adjacent to such an opening in order to enter it. The outside surface of tubes 16 do not aid the bees in escaping since they cannot crawl along it and turn the sharp corner at the end of the tube to enter it.

Now with reference to FIGS. 2 and 3, the dimensions and relationships which prevent bee escape will be described. Dimension A designates the length of entrance tube 16. This inventor has found that while there are no limits on the maximum length of the tube outside of practical considerations, it must have a length of at least about 9 millimeters. This dimension is significant since it bears a relationship to the approximate length of a typical yellow jacket bee. Thus, a tube of this length forces the bee to crawl along the tube outer surface such that they cannot crawl directly from the inside surface of housing 12 into the entrance tube inner end. As mentioned above, when the bees crawl along entrance tubes 16 in a horizontal direction, it is extremely difficult if not impossible for them to make the tight corner at the inner open end of the tube to escape.

Dimension B relates to the inside diameter of bee entrance tube 16. This diameter must be large enough to enable the bee to freely crawl into trap 10, but small enough to prevent bees from flying through the tube. This inventor has found that dimension B should be between 6 and 13 millimeters for the reasons mentioned above.

Dimension C refers to the distance between the inner end of bee entrance tube 16 and the opposing inside surface of housing 12 or to the end of another tube 16, whichever is closer. This dimension should also be a minimum of 9 millimeters to prevent a bee from crawling along the opposing housing wall directly into tube 16 or from one tube to another.

Dimension D relates to the vertical distance between the top surface of a liquid layer of attractant in the bottom of housing 12 and bee entrance tube 16. For the same reasons mentioned above, i.e., preventing a bee from bridging between one surface to the inner end of tube 16, that distance should also be at least 9 millimeters. Since it is necessary to accommodate some depth of liquid attractant 22 within housing 12, the vertical distance between bottom 20 and tube 16 should be sufficiently great to enable a recommended quantity of attractant liquid 22 to be placed within housing 12 so that dimension D remains at least 9 millimeters.

Entrances tube 16 must be of a thin wall variety to prevent a bee from being able to crawl along a vertical surface formed by the radial thickness of the tube at its inner end. This inventor believes that the thickness must be no greater than about 1.75 millimeters.

FIG. 4 illustrates an alternate embodiment of a bee trap housing designated by reference number 40. Features of housing 40 identical to those described above are identified by like reference numbers. Housing 40 differs from that previously described in that it includes two sets of vertically displaced groups of bee entrance tubes.

In use, a quantity of attractant liquid 22 is poured into housing 12 or 40 which is of some attracting color and presents an odor for drawing insects. Thereafter, lid 14 is snapped into position and the device is hung or placed in an area where the presence of bees creates a problem. Hanger 42 is shown for suspending the trap and fits under lid 14. Attracted bees crawl over the outer surface of housing 12, locate an aperture 30 and crawl into tube 16. As stated previously, once the bees are within the trap housing, they are unable to escape. Once a quantity of bees are trapped, the entire device may be disposed of. Plugs 44 may be provided which press fit into the tube outside apertures 30 to prevent the escape of bees when the device is disposed of.

While the above description constitutes the preferred embodiments of the present invention, it will be appreciated that the invention is susceptible of modification, variation and change without departing from the proper scope and fair meaning of the accompanying claims.

I claim:

1. A trap for bees comprising:
    a housing having a side portion with an open top and an enclosed bottom providing a reservoir for holding bee attracting substance,
    a lid removably attached to said open top, and
    at least one bee entrance tube having a first end attached to said side surface and extending horizontally into the interior of said housing with a second end within said housing, said housing side portion defining an entrance port communicating with the inside surface of said tube, thereby enabling bees to enter said trap through said entrance port while preventing their escape, said tube having a length of at least 9 millimeters, an inside diameter of between 6 and 13 millimeters, and wherein said second end is positioned at least 9 millimeters from a portion of said housing side portion opposite said port.

2. A trap for bees according to claim 1 wherein said tube is elevated at least 9 millimeters from said housing bottom.

3. A trap for bees according to claim 1 further comprising a plug press fit into said port for ensuring that bees cannot escape from said housing when the device is disposed of.

4. A trap for bees according to claim 1 wherein said housing is transparent.

5. A trap for bees according to claim 1 wherein said tube has a radial thickness of less than 1.75 millimeters.

6. A trap for bees according to claim 1 wherein said trap comprises a plurality of said tubes extending radially with respect to said housing and the second end of each tube is positioned at least 9 millimeters from the second end of other tubes of said plurality of tubes.

7. A trap for bees comprising:
    a transparent housing having a side portion forming an open top and an enclosed bottom forming a reservoir for holding a bee attracting substance,
    a lid removably attached to said open top, and
    a plurality of bee entrance tubes having a first end attached to said side surface and extending horizontally into the interior of said housing with a second end within said housing, said housing side portion defining an entrance port communicating with the inside surface of said tube, thereby enabling bees to enter said trap through said entrance port while preventing their escape, said tube having a length of at least 9 millimeters, an inside diameter of between 6 and 13 millimeters, and a thickness of less than 1.75 millimeters, said tubes elevated from said bottom surface more than 9 millimeters and said tube second end being spaced from an opposite inside surface of said housing at least 9 millimeters.

8. A trap for bees according to claim 7 further comprising a plug press fit into said port for ensuring that bees cannot escape from said housing when the device is disposed of.

* * * * *